US012705853B2

(12) United States Patent
Lee et al.

(10) Patent No.: US 12,705,853 B2
(45) Date of Patent: Aug. 11, 2026

(54) METHOD FOR LABELING BY AUTOMATICALLY CREATING PSEUDO 3D BOUNDING BOXES CORRESPONDING TO OBJECTS AND COMPUTING DEVICE USING THE SAME

(71) Applicant: StradVision, Inc., Pohang-si (KR)

(72) Inventors: Damin Lee, Seoul (KR); Dong Kyu Yu, Yongin-si (KR)

(73) Assignee: StradVision, Inc., Pohang-Si (KR)

(*) Notice: Subject to any disclaimer, the term of this patent is extended or adjusted under 35 U.S.C. 154(b) by 247 days.

(21) Appl. No.: 18/396,338

(22) Filed: Dec. 26, 2023

(65) Prior Publication Data

US 2025/0209775 A1 Jun. 26, 2025

(30) Foreign Application Priority Data

Dec. 21, 2023 (KR) ........................ 10-2023-0189015

(51) Int. Cl.
*G06V 10/25* (2022.01)
*G01S 17/89* (2020.01)

(52) U.S. Cl.
CPC .............. *G06V 10/25* (2022.01); *G01S 17/89* (2013.01)

(58) Field of Classification Search
CPC ................................ G06V 10/25; G01S 17/89
See application file for complete search history.

(56) References Cited

U.S. PATENT DOCUMENTS 10,402,724 B2 9/2019 Kim et al.
10,402,978 B1 * 9/2019 Kim ....................... G06V 10/82
11,403,860 B1 * 8/2022 Liao ....................... G06V 20/64
2010/0235129 A1 * 9/2010 Sharma ................... G01S 17/86 702/97

(Continued)

FOREIGN PATENT DOCUMENTS

CN 116229408 A 6/2023

OTHER PUBLICATIONS

Office Action issued in Korean Patent Application No. 10-2024-0160584, Feb. 15, 2025, 10 pp. w/ translation.

(Continued)

*Primary Examiner* — Qun Shen
(74) *Attorney, Agent, or Firm* — Kaplan Breyer Schwarz, LLP

(57) ABSTRACT

A method for labeling a specific object by automatically creating a specific pseudo 3d bounding box, includes steps of: (a) matching each of projected LiDAR 3D bounding boxes with each of GT 2D bounding boxes on an image coordinate system; and (b) in response to detecting that a certain projected LiDAR 3D bounding box is matched with its corresponding certain GT 2D bounding box, performing regression process on the certain projected LiDAR 3D bounding box, and in response to detecting that specific GT 2D bounding box is not matched with any specific projected LiDAR 3D bounding box, generating a specific pseudo 3D bounding box by referring to the specific GT 2D bounding box, average size information and rotational information of a specific object corresponding to the specific GT 2D bounding box and then performing the regression process on the pseudo 3D bonding box.

16 Claims, 12 Drawing Sheets
(5 of 12 Drawing Sheet(s) Filed in Color)

(56) References Cited

U.S. PATENT DOCUMENTS

| | | | | |
|---|---|---|---|---|
| 2014/0300732 | A1* | 10/2014 | Friend | G06T 7/73<br>348/135 |
| 2017/0228940 | A1* | 8/2017 | Kutliroff | G06V 20/00 |
| 2019/0011927 | A1* | 1/2019 | Mou | G06T 7/254 |
| 2019/0102677 | A1* | 4/2019 | Kim | G06V 20/58 |
| 2019/0379819 | A1* | 12/2019 | Shimada | G06V 10/454 |
| 2021/0302992 | A1* | 9/2021 | Chen | G05D 1/0088 |
| 2023/0085898 | A1* | 3/2023 | Dijkman | G01S 7/2955<br>702/97 |
| 2023/0156272 | A1* | 5/2023 | Huang | H04N 21/4728<br>386/285 |
| 2023/0401725 | A1* | 12/2023 | Truong | G06Q 30/06 |
| 2025/0111687 | A1* | 4/2025 | Meyer | G06V 30/146 |

OTHER PUBLICATIONS

Charles R Qi et al, “Frustum PointNets for 3D Object Detection from RGB-D Data”, arxiv.org, Cornell University Library, 201 Olin Library Cornell University, Ithaca, NY, Nov. 22, 2017, 15 pp.

Di Yuan et al, “Accurate Bounding-box Regression with Distance-IoU Loss for Visual Tracking”, arxiv.org, Cornell University Library, 201 Olin Library Cornell University, Ithaca, NY, Jan. 20, 2022, DOI: 10.1016/J.JVCIR.2021.103428, 18 pp.

Extended European Search Report issued in European Patent Application No. 24221757, filed May 8, 2025, 10 pp.

Jieqi Shi et al, “You Only Label Once: 3D Box Adaptation from Point Cloud to Image via Semi-Supervised Learning”, arxiv.org, Cornell University Library, 201 Olin Library Cornell University, Ithaca, NY, Sep. 12, 2023, 8 pp.

* cited by examiner

FIG. 2

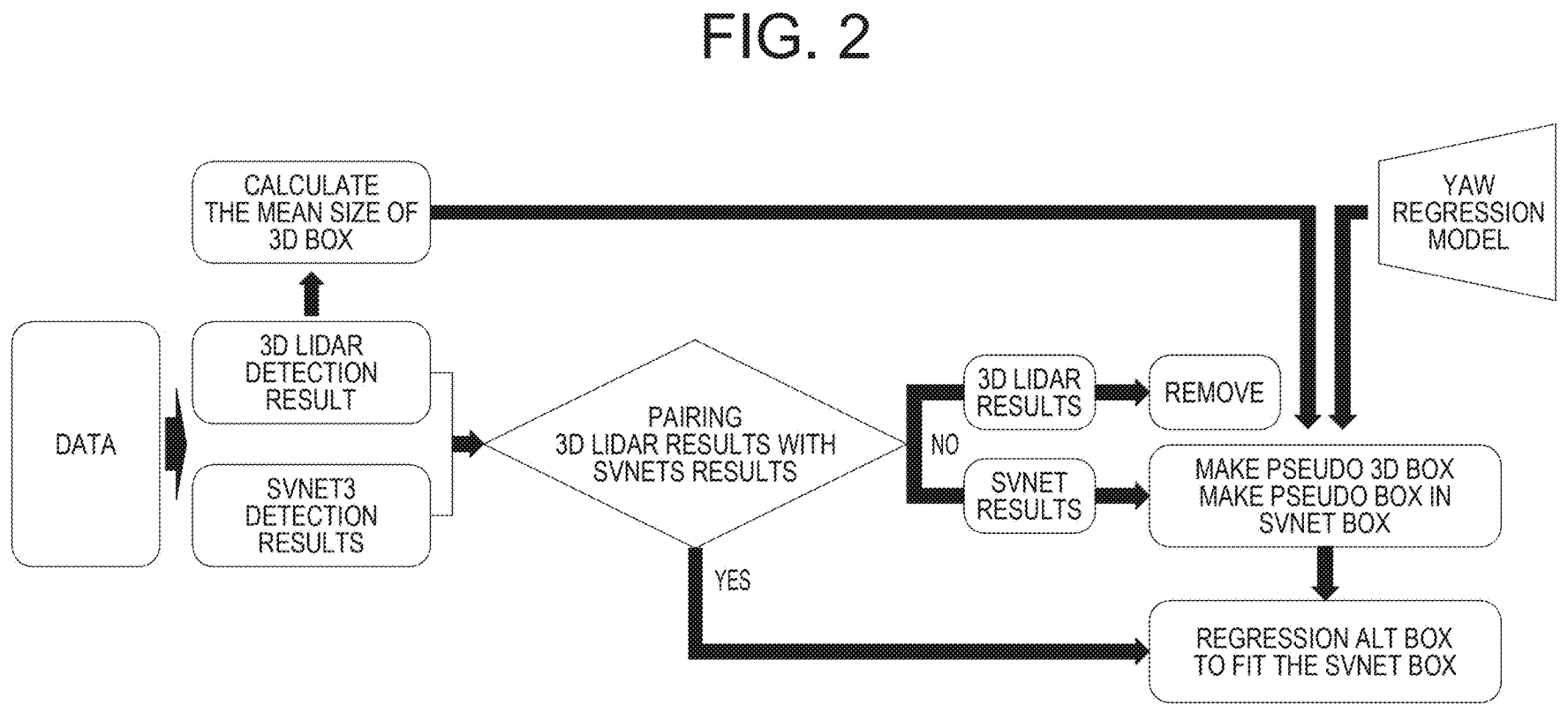

DATA

3D LIDAR DETECTION RESULT

SVNET3 DETECTION RESULTS

CALCULATE THE MEAN SIZE OF 3D BOX

PAIRING 3D LIDAR RESULTS WITH SVNETS RESULTS

NO

YES

3D LIDAR RESULTS

SVNET RESULTS

REMOVE

YAW REGRESSION MODEL

MAKE PSEUDO 3D BOX MAKE PSEUDO BOX IN SVNET BOX

REGRESSION ALT BOX TO FIT THE SVNET BOX

FIG. 8

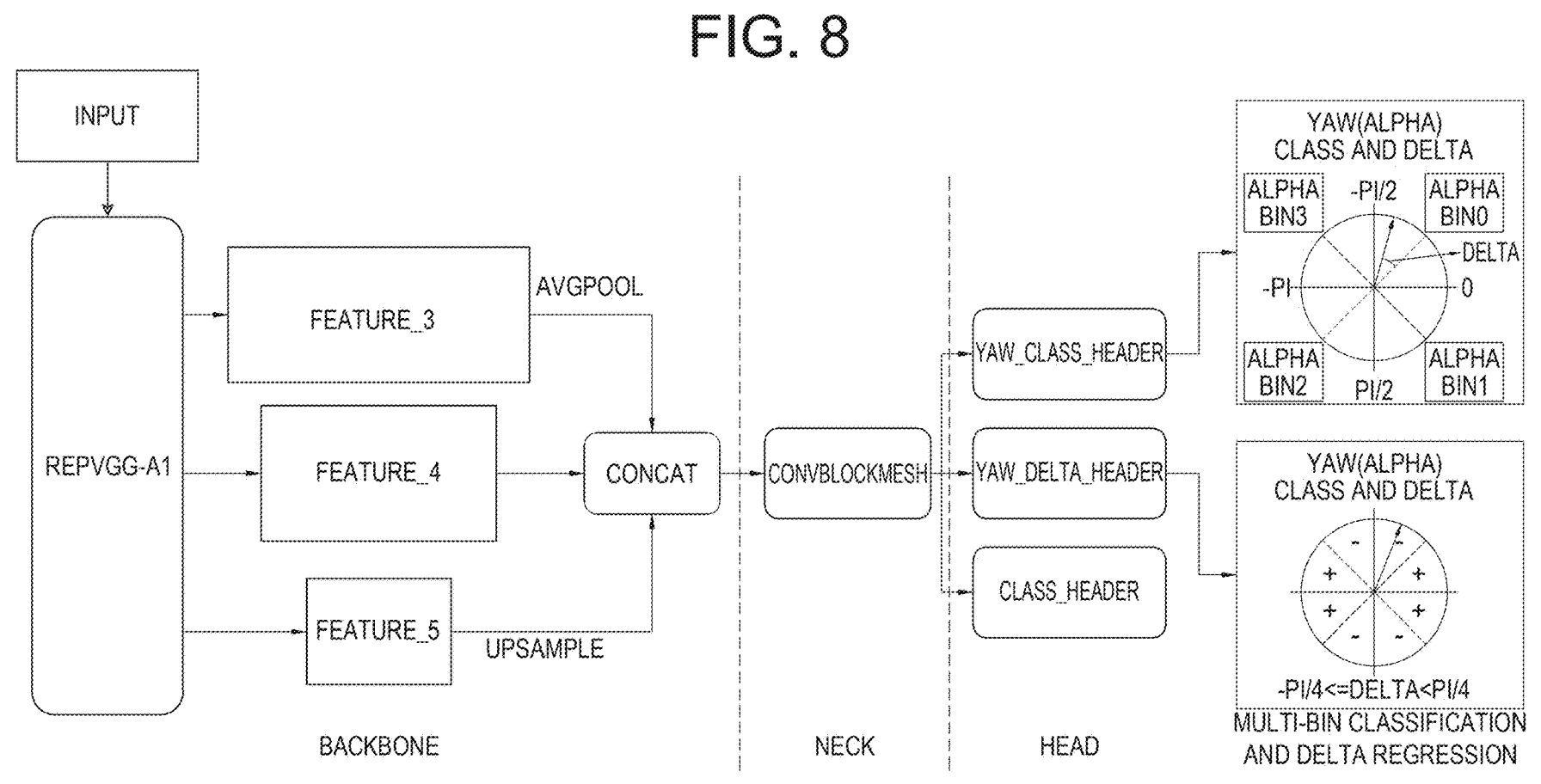

INPUT
REPVGG-A1
FEATURE_3
FEATURE_4
FEATURE_5
AVGPOOL
UPSAMPLE
CONCAT
CONVBLOCKMESH
YAW_CLASS_HEADER
YAW_DELTA_HEADER
CLASS_HEADER
BACKBONE
NECK
HEAD
YAW(ALPHA) CLASS AND DELTA
ALPHA BIN0
ALPHA BIN1
ALPHA BIN2
ALPHA BIN3
DELTA
0
-PI/2
PI/2
-PI
YAW(ALPHA) CLASS AND DELTA
-PI/4<=DELTA<PI/4
MULTI-BIN CLASSIFICATION AND DELTA REGRESSION

METHOD FOR LABELING BY AUTOMATICALLY CREATING PSEUDO 3D BOUNDING BOXES CORRESPONDING TO OBJECTS AND COMPUTING DEVICE USING THE SAME

CROSS REFERENCE OF RELATED APPLICATION

The present application claims the benefit of the earlier filing date of Korean provisional patent application No. 10-2023-0189015, filed on Dec. 21, 2023, the entire contents of which are incorporated herein by reference.

FIELD OF THE DISCLOSURE

The present disclosure relates to a method for labeling objects by automatically generating pseudo 3D bounding boxes corresponding to the objects, and a computing device using the same.

BACKGROUND OF THE DISCLOSURE

There are lots of researches on object recognition using machine learning technologies. As one of the machine learning technologies, Deep Learning for training a neural network, which includes an input layer, an output layer and multiple hidden layers between the input layer and the output layer, achieves an impressive recognition performance.

The Deep Learning using the neural network performs learning process normally through a backpropagation algorithm using loss values. To this end, the Deep Learning requires multiple labeled data, i.e., training data assigned with tags using labelling tools. Since pointing devices can be used as the labelling tools to generate the labeled data, e.g., 3D bounding boxes, cost for developing the labelling tools is not burdensome.

However, in case the labeled data are generated by using conventional labelling tools such as the pointing devices, since labelling workers should use the pointing devices to generate the 3D bounding boxes, the labelling workers may be distracted during repetitive labelling processes and thus often make mistakes. Further, even if educational courses related to labelling processes are preliminarily provided to the labelling workers, the educational courses cannot prevent mistakes of the labelling workers during the repetitive labelling processes completely, and therefore the labeled data acquired from the labelling processes should be inspected and thus a cost for inspecting the labeled data may be much increased.

A labelling worker may drag a pointing device to generate 2D bounding boxes for objects while checking the objects in images, whereas the labelling worker should set a size of the 3D bounding boxes, i.e. width, height, and length, and rotational information of the 3D bounding boxes, i.e. roll, pitch, and yaw, while checking three-dimensional Cartesian coordinates of the objects, i.e. x, y, and z. But, setting the size and the rotational information of the 3D bounding boxes is more difficult compared to generating the 2D bounding boxes. Thus, it may take a longer time to generate the 3D bounding boxes for the objects than to generate the 2D bounding boxes for the same objects.

Accordingly, a technology for solving the problems above is demanded.

SUMMARY OF THE DISCLOSURE

It is an object of the present disclosure to solve all the aforementioned problems.

It is another object of the present disclosure to generate each of 3D bounding boxes and each of 2D bounding boxes for each of objects on an image coordinate system by using LiDAR data, image data and calibration data and then match each of the 3D bounding boxes with each of the 2D bounding boxes, thereby checking whether it is necessary to generate a pseudo 3D bounding box for each of the objects.

It is still another object of the present disclosure to generate a specific pseudo 3D bounding box of a specific object by referring to a specific 2D bounding box of the specific object on the image coordinate system, an average size of a specific 3D bounding box of a specific class related to the specific object acquired from LiDAR model, and rotational information of the specific object.

In accordance with one example embodiment of the present disclosure, there is provided a method for labeling at least one specific object by automatically creating at least one specific pseudo 3D bounding box, including steps of: (a) a computing device matching each of projected LiDAR 3D bounding boxes with each of GT 2D bounding boxes on an image coordinate system, wherein each of the projected LiDAR 3D bounding boxes on the image coordinate system is acquired by using raw data including LiDAR data, image data and calibration data; and (b) (b1) in response to detecting that a certain projected LiDAR 3D bounding box is matched with its corresponding certain GT 2D bounding box, the computing device performing a regression process on the certain projected LiDAR 3D bounding box for fitting the certain projected LiDAR 3D bounding box into the certain GT 2D bounding box, and (b2) in response to detecting that specific GT 2D bounding box is not matched with any specific projected LiDAR 3D bounding box, the computing device generating a specific pseudo 3D bounding box by referring to the specific GT 2D bounding box, average size information and rotational information of a specific object corresponding to the specific GT 2D bounding box and then performing the regression process on the pseudo 3D bonding box for fitting the pseudo 3D bounding box into the specific GT 2D bounding box.

In accordance with another example embodiment of the present disclosure, there is provided a computing device for labeling at least one specific object by automatically creating at least one specific pseudo 3D bounding box, comprising: at least one memory which saves instructions; and at least one processor configured to execute the instructions to perform or support another device to perform processes of: (I) a computing device matching each of projected LiDAR 3D bounding boxes with each of GT 2D bounding boxes on an image coordinate system, wherein each of the projected LiDAR 3D bounding boxes on the image coordinate system is acquired by using raw data including LiDAR data, image data and calibration data; and (II) (II_1) in response to detecting that a certain projected LiDAR 3D bounding box is matched with its corresponding certain GT 2D bounding box, the computing device performing a regression process on the certain projected LiDAR 3D bounding box for fitting the certain projected LiDAR 3D bounding box into the certain GT 2D bounding box, and (II_2) in response to detecting that specific GT 2D bounding box is not matched with any specific projected LiDAR 3D bounding box, the computing device generating a specific pseudo 3D bounding box by referring to the specific GT 2D bounding box, average size information and rotational information of a specific object corresponding to the specific GT 2D bounding box and then performing the regression process on the pseudo 3D bonding box for fitting the pseudo 3D bounding box into the specific GT 2D bounding box.

In addition, recordable media that are readable by a computer for storing a computer program to execute the method of the present disclosure is further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

Figure 1:
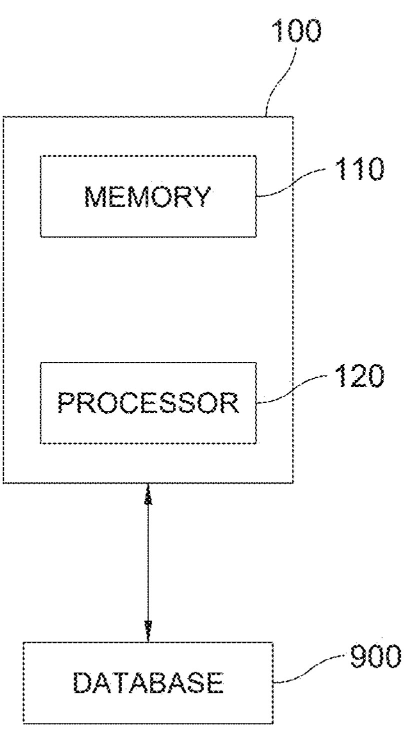

FIG. 1 is a drawing schematically illustrating a configuration of a computing device for labeling at least one object by automatically creating at least one pseudo 3D bounding box corresponding to the object.

FIG. 2 is a flow chart schematically illustrating a process of automatically generating the pseudo 3D bounding box for the object.

Figure 3A:
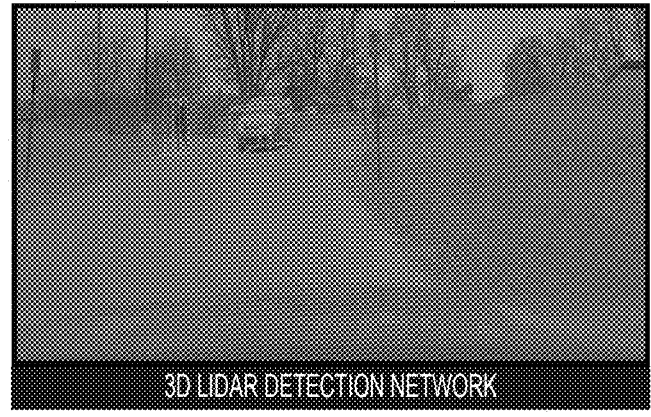
Figure 3B:
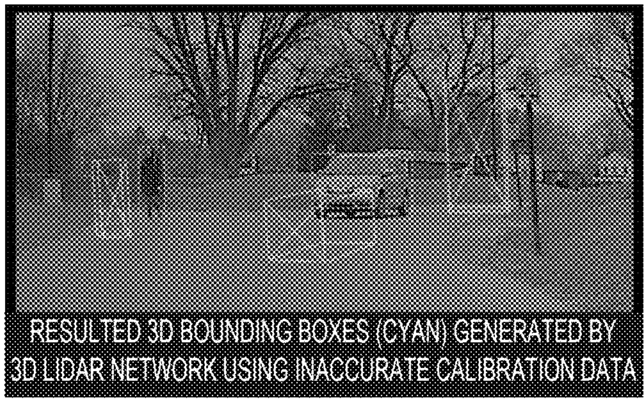
Figure 3C:
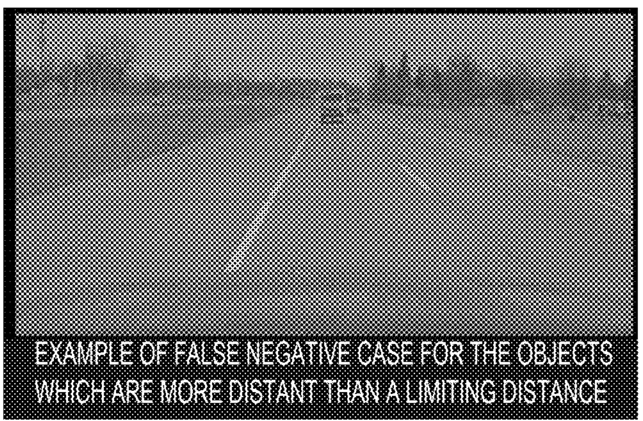

FIGS. 3A to 3C are drawings schematically illustrating examples of LiDAR 3D bounding boxes generated by using a 3D LiDAR model.

Figure 4:
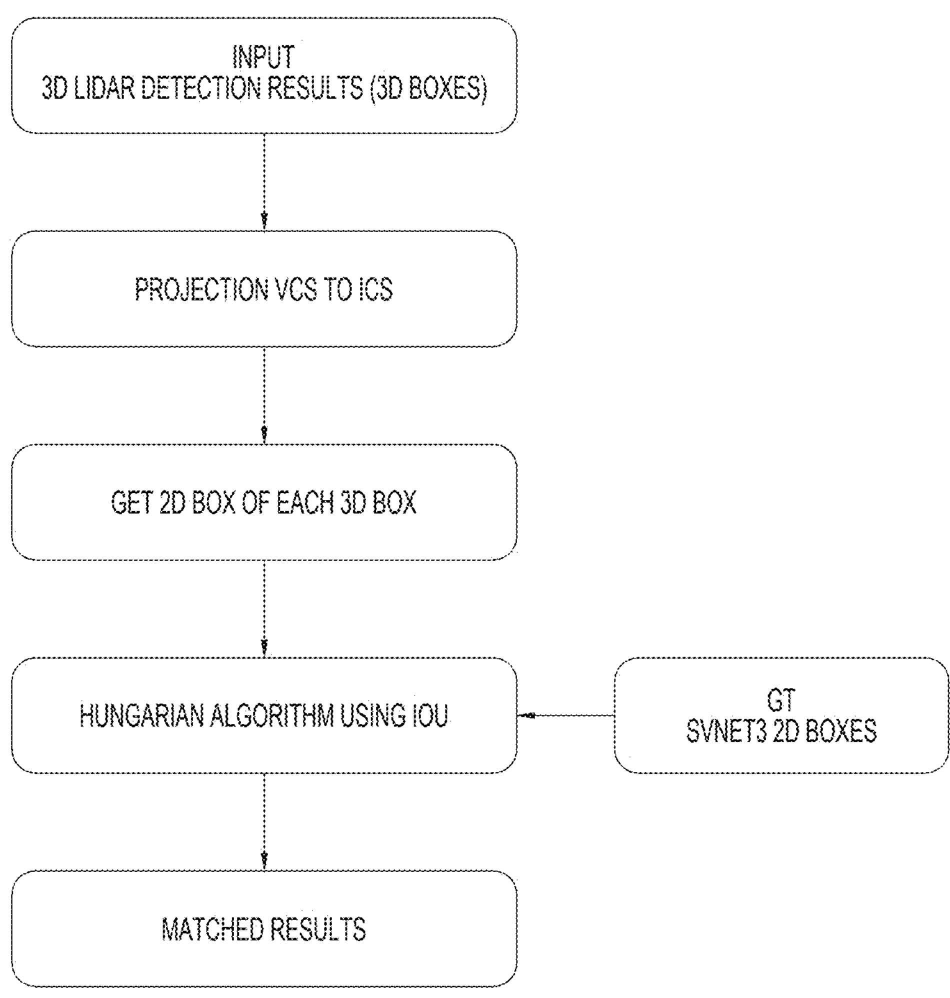

FIG. 4 is a flow chart schematically illustrating a process of matching the LiDAR 3D bounding boxes with GT 2D bounding boxes on an image coordinate system.

Figure 5:
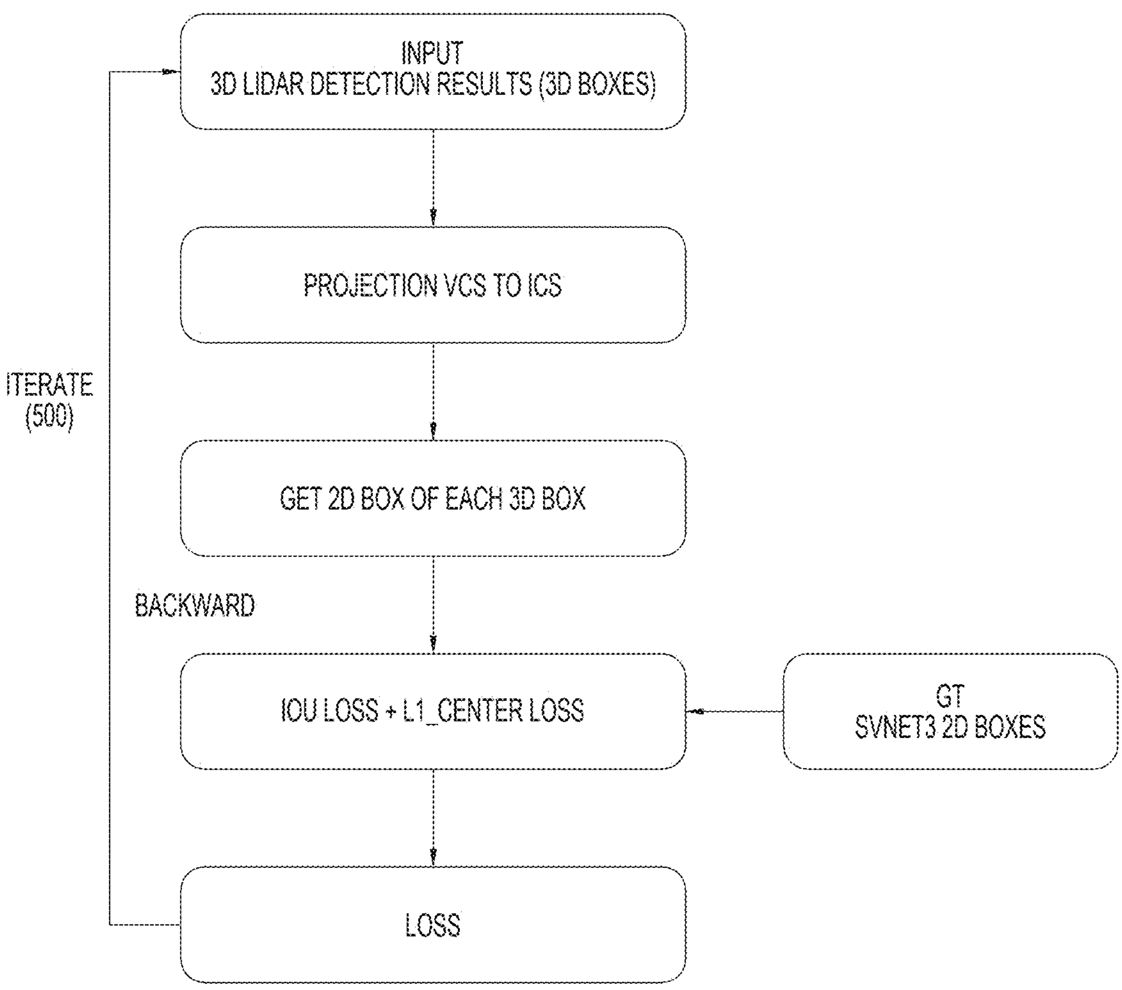

FIG. 5 is a flow chart schematically illustrating a process of adjusting the projected LiDAR 3D bounding boxes such that the projected LiDAR 3D bounding boxes are fitted to their corresponding GT 2D bounding boxes.

Figure 6:
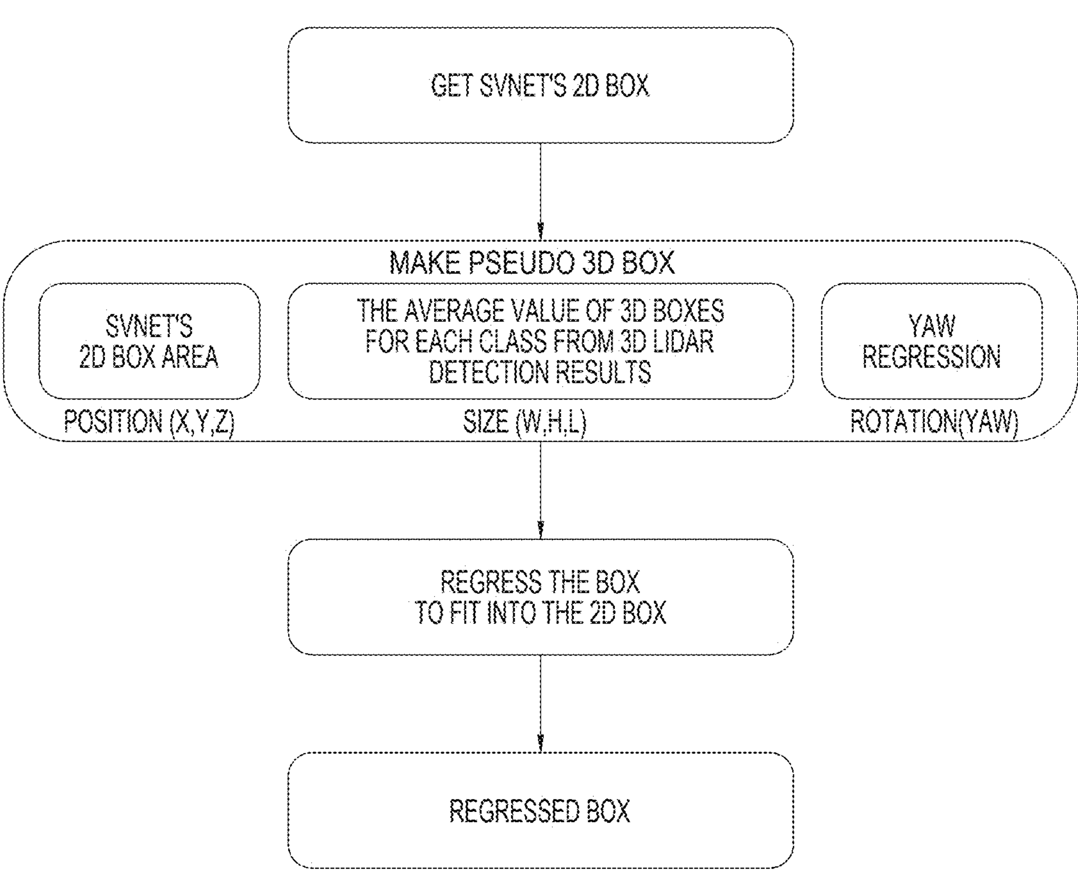

FIG. 6 is a flow chart schematically illustrating a process of generating the pseudo 3D bounding box for the object whose LiDAR 3D bounding box is not generated although the GT 2D bounding box is generated for the object on the image data.

Figure 7:
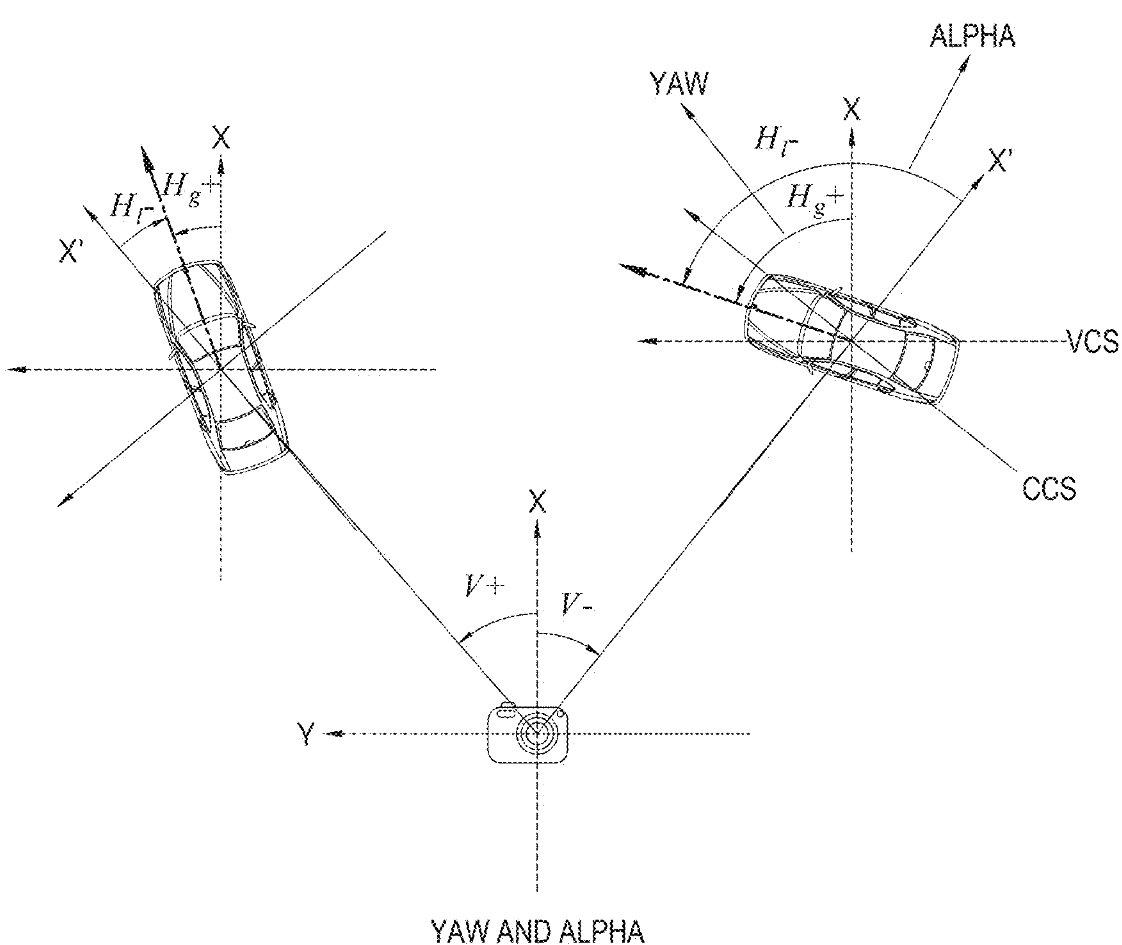

FIG. 7 is a drawing schematically illustrating a process of estimating an alpha which represents an angle of rotation of a vehicle as the object on a camera coordinate system by using a yaw which represents an angle of rotation of the vehicle on a vehicle coordinate system.

FIG. 8 is a drawing schematically illustrating an architecture of a yaw regression model for estimating the alpha of the object.

Figure 9A:
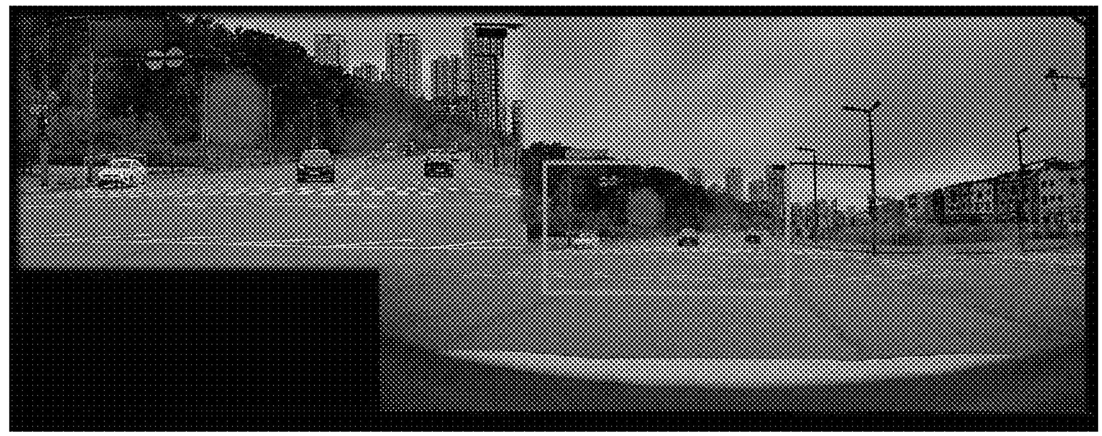
Figure 9B:
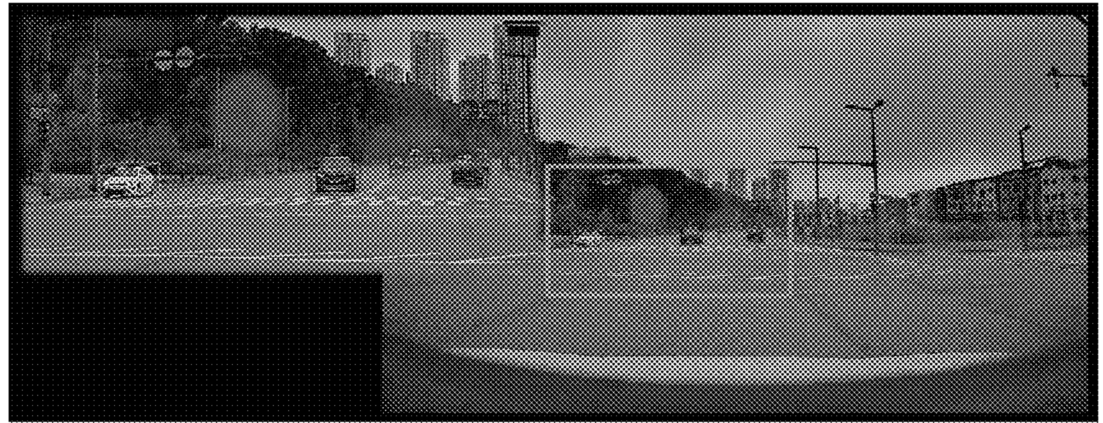

FIGS. 9A and 9B are drawings schematically illustrating results of generating 3D bounding boxes of objects in a same image data between a conventional technology and the present invention.

DETAILED DESCRIPTION OF THE PREFERRED EMBODIMENTS

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components, or steps. Other objects, benefits and features of the present disclosure will be revealed to one skilled in the art, partially from the specification and partially from the implementation of the present disclosure. The following examples and drawings will be provided as examples, but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

FIG. 1 is a drawing schematically illustrating a configuration of a computing device for labeling at least one object by automatically creating at least one pseudo 3D bounding box corresponding to the object.

By referring to FIG. 1, the computing device 100 includes at least one memory 110 which stores at least one instruction for labeling objects by automatically creating pseudo 3D boxes corresponding to the objects and at least one processor 120 which automatically generates the pseudo 3D boxes of the objects to be used for preprocessing of labeling processes according to the instruction in the memory 110. Further, the computing device 100 may represent a personal computer, a mobile computer, etc.

Specifically, any combination of a computing hardware and a computing software may be configured as the computing device 100 for achieving a required systematic performance for the method of the presented invention. The computing hardware may include at least one type of components among following types: a computing processor, a memory, a storage, an input device, an output device, and other components included by existing computing devices; and an electronic telecommunication device such as router and switch; and an electronic data storage system such as network-attached storage and storage area network. Also, the computing software may include the instructions which supports the computing device 100 to function in specific way.

Further, the processor 120 of the computing device 100 may include following hardware components: a micro processing unit, i.e., MPU, a central processing unit, i.e., CPU, a cache memory, and a data bus. Further, the computing device 100 also include following software components: at least one operation system and at least one application on specific purposes.

As another example, the computing device 100 may include at least one medium processor and at least one integrated processor which is combined with at least one memory.

Also, the computing device 100 may be interworked with at least one database 900 which stores information to be used for labelling objects by automatically generating the pseudo 3D bounding boxes for the objects. Herein, the database 900 may include at least one type of storage medium among following types: a flash memory type, a hard disk type, a multimedia card micro type, a card type memory (for instance, an SD memory or an XD memory), a random-access memory, i.e., RAM, a static random-access memory, i.e., SRAM, a read-only memory, i.e., ROM, an electrically erasable programmable read-only memory, i.e., EEPROM, a magnetic memory, a magnetic disk, an optical disk, but it is not limited thereto, such that the database also include all storage mediums capable of saving data. Also, the database 900 may be configured in a separated place from the computing device 100. In contrary, the database 900 may also be configured inside the computing device 100 to send data to the computing device 100 or to write received data. For convenience, the number of the database 900 may be one but two or more as the case may be.

FIG. 2 is a flow chart schematically illustrating a process of automatically generating at least one pseudo 3D bounding box for at least one object.

First, by referring to FIG. 2, raw data may include image data, LiDAR data and calibration data. As one example, the calibration data may include intrinsic parameters of a camera, extrinsic parameters of the camera and parameters for converting the LiDAR data into the image data but it is not limited there to.

Also, the computing device 100 inputs the LiDAR data into a 3D LiDAR model and then instructs the 3D LiDAR model to generate at least one LiDAR 3D bounding box (i.e., a block of "3D LiDAR detection results" in FIG. 2) of at least one object on the LiDAR data through certain calculations of the 3D LiDAR model. In addition, the computing device 100 inputs the image data acquired from the camera into SVNet3 and then instructs the SVNet3 to generate at least one GT 2D bounding box for the object on the image data. Herein, the SVNet3 is a deep learning model which can detect the object from the image data and then generate the 2D bounding box (serving as the GT 2D bounding box) corresponding to the detected object. Since the SVNet3 has a high degree of accuracy in detecting various objects, various 2D bounding boxes acquired by the SVNet3 for the objects can be considered as the GT 2D bounding boxes or pseudo GT 2D bounding boxes, but it is not limited thereto. As another example, the GT 2D bound boxes can be acquired from other deep learning models or from manual labelling processes.

In accordance with present disclosure, examples of the LiDAR 3D bounding boxes outputted from the LiDAR 3D model are provided by referring to FIG. 3.

FIGS. 3A to 3C are drawings schematically illustrating examples of the LiDAR 3D bounding boxes generated by using the 3D LiDAR model.

FIG. 3A illustrates projected 3D bounding boxes on image data. In detail, each of the projected 3D bounding boxes is generated by projecting each of the LiDAR 3D bounding boxes of the objects onto the image data using the calibration data.

By referring to FIG. 3A, two projected 3D bounding boxes corresponding to a human and a vehicle are shown in green color. Further, by referring to FIG. 3B, there are some mismatches between the projected 3D bounding boxes (e.g., the left-most projected 3D bounding box and the middle projected 3D bounding box) in cyan and their corresponding GT 2D bounding boxes in green due to the inaccurate calibration data, etc. Also, in FIG. 3B, there is a false positive case in that the right-most projected 3D bounding box is generated without its corresponding GT 2D bounding box. Furthermore, by referring to FIG. 3C, one object is detected as one projected 3D bounding box in green but another object (which is located on the right side of the one object) is not detected and thus said another object is considered as a false negative case due to sparse point cloud data of the LiDAR corresponding to said another object which is more distant than a specific limiting distance.

Thus, it is necessary to reduce various cases of the false positive and/or the false negative as shown in FIGS. 3B and 3C.

By referring to FIG. 2 again, in order to reduce the false positive and/or the false negative, the computing device 100 checks whether each of the projected LiDAR 3D bounding boxes is matched with each of the GT 2D bounding boxes on the image data. In detail, the computing device 100 may acquire the GT 2D bounding boxes on the image data outputted from the SVNet3 model and acquire the projected LiDAR 3D bounding boxes by projecting the LiDAR 3D bounding boxes outputted from the 3D LiDAR model onto the image data. Then the computing device 100 may check whether each of the projected LiDAR 3D bounding boxes is matched with each of the 2D bounding boxes.

In case a certain projected LiDAR 3D bounding box and a certain GT 2D bounding box have some overlapped area, the computing device 100 may determine that the some overlapped area is caused by the inaccurate calibration data or other possible defects. Otherwise, in case a specific projected LiDAR 3D bounding box and a specific GT 2D bounding box do not have any overlapped area, the computing device 100 may consider the specific object as the false positive or the false negative.

Then, in case the certain projected LiDAR 3D bounding box and the certain GT 2D bounding box have some overlapped area, the computing device 100 may perform a regression process such that the LiDAR 3D bounding box is fitted into the GT 2D bounding box. Otherwise, in case the specific projected LiDAR 3D bounding box and the specific GT 2D bounding box do not have any overlapped area, (i) if there is only the specific projected LiDAR 3D bounding box without the specific GT 2D bounding box, the computing device 100 may delete the specific projected LiDAR 3D bounding box and (ii) if there is only the specific GT 2D bounding box without the specific projected LiDAR 3D bounding box, the computing device 100 may generate a specific pseudo 3D bounding box by referring to the GT 2D bounding box, average size information and rotational information of a specific object corresponding to the specific GT 2D bounding box. Herein, the size information of the specific object may be acquired by referring to specific class information of the specific object included in the specific GT 2D bounding box. For reference, the 3D LiDAR model can provide the size information of the specific object if the specific class information is inputted thereto. Further, the rotational information of the specific object may be acquired from a yaw regression model. Then, the computing device 100 may perform the regression process on the specific pseudo 3D bounding box such that the pseudo 3D bounding box is fitted into the specific GT 2D bounding box.

In accordance with one example embodiment of the present disclosure, processes for solving the aforementioned problems explained in FIGS. 3B and 3C are provided by referring to FIG. 4 to FIG. 8.

FIG. 4 is a flow chart schematically illustrating a process of matching the projected LiDAR 3D bounding boxes with the GT 2D bounding boxes on an image coordinate system.

First, the computing device 100 may acquire information on each of the LiDAR 3D bounding boxes from the LiDAR 3D model, and project each of the LiDAR 3D bounding boxes on a vehicle coordinate system, i.e. VCS, onto the image coordinate system, i.e. ICS, by referring to the calibration data corresponding to the LiDAR 3D bounding boxes, thereby generating the projected LIDAR 3D bounding boxes on the image data.

Then, the computing device 100 may generate projected 2D bounding boxes each of which corresponds to each of the projected LiDAR 3D bounding boxes by referring to each minimum value and each maximum value of coordinates of each of the projected LiDAR 3D bounding boxes, and detect an overlapped area between each of the projected 2D bounding boxes and each of the GT 2D bounding boxes, thereby calculating IoU metric, i.e., intersection-over-union metric, through Hungarian algorithm. Herein the GT 2D bounding boxes are acquired from an object recognition model, e.g., SVNet3, which detects the objects from the image data with a relatively higher recognition performance.

For instance, a value of IoU may have a range of between '0' to '1'. If the value of IoU is '0', it represents that there are no overlapped area between the projected 2D bounding box and the GT 2D bounding box, and therefore it is considered as the false positive or the false negative. Otherwise, if the value of IoU is larger than 0 and smaller than 1 such as '0.01' and '0.99', the computing device 100 may determine that the projected 2D bounding box and the GT 2D bounding box correspond to a same object. Otherwise, if the value of IoU is '1', the computing device 100 may determine that the projected 2D bounding box and the GT 2D bounding box overlap perfectly with each other, but it is not limited thereto.

A process of fitting the projected 3D bounding box to the GT 2D bounding box should be performed when the value of IoU is larger than 0 and smaller than 1. The process of fitting will be explained in detail by referring to FIG. 5, and the process of generating the pseudo 3D bounding box will be explained in detail by referring to the FIG. 6.

FIG. 5 is a flow chart schematically illustrating a process of adjusting the projected LiDAR 3D bounding boxes such that the IoU in-between the projected LiDAR 3D bounding boxes and the GT 2D bounding box is increased.

By referring to FIG. 5, the computing device 100 should project each of the LiDAR 3D bounding boxes on the vehicle coordinate system outputted from the 3D LiDAR model onto the image coordinate system, thereby generating each of its corresponding projected 2D bounding boxes on the image coordinate system, as explained in FIG. 4.

In addition, the computing device 100 calculates a total loss by referring to an IoU loss and an L1 loss. Herein, the computing device 100 calculates the IoU loss by referring to a matched ratio between the projected 2D bounding box and the GT 2D bounding box. Also, the computing device 100 calculates the L1 loss by referring to the absolute difference between a center of the projected 2D bounding box and a center of the GT 2D bounding box.

Further, the computing device 100 performs a backpropagating process using the total loss repetitively, e.g., N times, thereby fitting the projected 2D bounding box into the GT 2D bounding box.

FIG. 6 is a flow chart schematically illustrating a process of generating the pseudo 3D bounding box for the object whose LIDAR 3D bounding box is not generated although the GT 2D bounding box is generated for the object on the image data.

Before the processes of FIG. 6, in response to detecting that there is only the specific projected LiDAR 3D bounding box without the specific GT 2D bounding as the false positive case, the computing device 100 may delete the specific projected LiDAR 3D bounding box.

By referring to FIG. 6, the computing device 100 may acquire the specific GT 2D bounding box corresponding to the specific object which is only detected by SVNet3, i.e., the object recognition model, and then acquire 3D position information of the specific object by referring to a position x, y of the specific GT 2D bounding box and a depth z of the specific object from the LiDAR data. Also, since the 3D LiDAR model stores and manages average size information, e.g. a width, a height, and a length, of the specific object with the specific class information, the computing device 100 acquires the average size information of the specific LiDAR 3D bounding box from the 3D LiDAR model by referring to the specific class information of the specific object corresponding to the specific GT 2D bounding box. Finally, the computing device 100 may acquire the rotational information of the specific object by using the yaw regression model.

Even if the computing device 100 has acquired the 3D position information of the specific object and the average size information of the specific object class, in case the rotational information of the specific object cannot be acquired, the specific pseudo 3D bounding box cannot also be set accurately. In detail, since the specific object may be headed with an arbitrary rotational information, e.g., a 45 degrees, a 90 degrees, a 180 degrees etc., the computing device 100 may use the yaw regression model to reflect the rotational information on the specific object in the image data, thereby generating the specific pseudo 3D bounding box by using the specific GT 2D bounding box.

The algorithm and the architecture of the yaw regression model will be explained by referring to FIG. 7 and FIG. 8.

FIG. 7 is a drawing schematically illustrating a process of estimating an alpha which represents an angle of rotation of a vehicle as the object on a camera coordinate system by using a yaw which represents an angle of rotation of the vehicle on a vehicle coordinate system.

In FIG. 7, on the assumption that an x-axis and a y-axis on the vehicle coordinate system are provided, the angle of rotation of the vehicle from the x-axis or the y-axis on the VCS may be defined as the yaw of the vehicle. In addition, on the assumption that an x-axis and a y-axis on the camera coordinate system, i.e. CCS, are provided, the angle of rotation of the vehicle on the CCS, i.e., an angle between a direction of watching the vehicle from the origin of the CCS, i.e., a location of the camera taking an image of the vehicle, and a heading direction of the vehicle may be defined as the alpha of the vehicle, but it is not limited thereto.

Since it is easier to estimate the alpha of the vehicle by referring to the image data acquired from the camera through a machine learning model than to estimate the yaw of the vehicle on the VCS, a process of estimating the alpha of the vehicle should be performed first and then a process of converting the alpha of the vehicle to the yaw of the vehicle is performed by referring to the calibration parameters.

FIG. 8 is a drawing schematically illustrating the architecture of the yaw regression model for estimating the alpha of the object.

FIG. 8 illustrates that the architecture of the yaw regression model includes a backbone part, a neck part, and a head part. In response to acquiring an input image data at the backbone part, RegVGG-A1 of the backbone part may output Feature_3 to Feature_5 and then Feature_3 to Feature_5 are concatenated. And in response to acquiring the concatenated data from the backbone part, the neck part applies one or more convolutional operations to the concatenated data. Then, the head part may estimate the alpha of the vehicle by referring to outputs from FC layers each of which corresponds to Yaw_class_header and Yaw_delta_header. Herein, the RegVGG-A1 may be a convolution neural network, i.e. CNN, based on a visual geometry group, i.e. VGG.

By referring to an upper graph on the right side of FIG. 8 which is related to the Yaw_class_header, the head part may check how much the vehicle is rotated among 360 degrees, and each of quadrants on the CCS may be assigned as Alpha bin0, Alpha bin1, Alpha bin2, and Alpha bin3.

As an example, in case the vehicle corresponds to '0' class, i.e. Alpha bin0, the head part may conclude that the vehicle is headed toward an outward direction of the first quadrant of the CCS. In addition, the head part may output a delta of the vehicle which represents how much the vehicle is rotated in the Alpha bin0 from a predetermined line which is determined in-between 0 degree to 90 degrees in the Alpha bin0. For example, the predetermined line may be 45 degrees in the Alpha bin0, but it is not limited thereto. In case of '1' class, '2' class, and '3' class, the explanation thereon may be similar and thus the explanation thereon will be omitted.

In addition, by referring to the lower graph on the right side of FIG. 8 which is related to the Yaw_delta_header, the head part may estimate the alpha of the vehicle by checking whether it belongs to '+' or '−' in its corresponding quadrant.

FIGS. 9A and 9B are drawings schematically illustrating results of generating 3D bounding boxes of objects in a same image data between a conventional technology and the present invention.

By referring to FIG. 9A, only one projected LiDAR 3D bounding box is shown according to the conventional technology. In detail, as shown in an enlarged region for a green box in FIG. 9A on the left part of FIG. 9A, one projected LiDAR 3D bounding box is generated for the left-most vehicle in cyan color, while there are many other vehicles on the image data without any bounding boxes. Also, there is a certain mismatch between the left-most vehicle and the projected LiDAR 3D bounding box.

By referring to FIG. 9B, the projected 3D bounding boxes are generated on the same image data according to the present invention. In detail, as shown in an enlarged region for a green box in FIG. 9B on the left part of FIG. 9B, a location of the bounding box for the left-most vehicle is adjusted, and other multiple bounding boxes corresponding to other vehicles on the image data are successfully generated.

The presented invention has an effect of generating each of the 3D bounding boxes and each of the 2D bounding boxes for each of the objects on the image coordinate system by using the LiDAR data, the image data and the calibration data and then match each of the 3D bounding boxes with each of the 2D bounding boxes, thereby checking whether it is necessary to generate a pseudo 3D bounding box for each of the objects.

The presented invention has another effect of generating the specific pseudo 3D bounding box of the specific object by referring to the specific 2D bounding box of the specific object on the image coordinate system, the average size of the specific 3D bounding box of the specific class related to the specific object acquired from the 3D LiDAR model, and the rotational information of the specific object.

The suggested processes, which is in accordance with one example embodiment of the present disclosure, can be implemented in a programmed command which can be performed by various computer component, and can be written on a machine-readable medium or machine-decipherable medium. The machine-readable medium or machine-decipherable medium may include program commands, data files, data structures, or combination of aforementioned elements. The program commands written on the machine-readable medium or machine-decipherable medium may be specifically designed or complied only to perform aforementioned processes or may be allowed to use after notices to those skilled in the art of present disclosure. The machine-readable medium or machine-decipherable medium can be one of follow media: a hard disk, a magnetic medium such as a floppy disk or a magnetic tape, an optical medium such as CD-ROM and DVD, a magnetooptical medium such as a floptical disk, a ROM, a RAM, a Flash memory, and other hardware components which are designed to save and perform the program commands. The program commands may be written in one of complied languages or one of interpreted languages. The hardware device may be configured to perform the process of this disclosure as at least one or more software module, and vice versa.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

The invention claimed is:

1. A method for labeling one or more specific objects by automatically creating one or more specific pseudo 3-Dimensional (3D) bounding boxes, comprising steps of:

(a) acquiring, by a computing device, each of one or more projected 3D LiDAR bounding boxes on an image coordinate system by using raw data including LiDAR data, image data and calibration data, and determining whether each of the projected 3D LiDAR bounding boxes is matched with each of one or more 2-Dimensional (2D) Ground Truth (GT) bounding boxes on the image coordinate system; and (b) executing, by the computing device, sub-processes of (b1) in response to detecting that each of one or more 1-st projected 3D LiDAR bounding boxes among the projected 3D LiDAR bounding boxes and each of one or more 1-st 2D GT bounding boxes among the 2D GT bounding boxes are matched with each other, performing, by the computing device, a regression process on each of the 1-st projected 3D LiDAR bounding boxes for fitting each of the 1-st projected 3D LiDAR bounding boxes into each of the 1-st 2D GT bounding boxes, and (b2) in response to detecting that each of one or more 2-nd 2D GT bounding boxes among the 2D GT bounding boxes is not matched with any one of the projected 3D LiDAR bounding boxes, generating, by the computing device, each of the specific pseudo 3D bounding boxes corresponding to each of the specific objects by referring to each of the 2-nd 2D GT bounding boxes and each piece of average size information and each piece of rotational information of each of the specific objects corresponding to each of the 2-nd 2D GT bounding boxes and then performing the regression process on each of the pseudo 3D bounding boxes for fitting each of the pseudo 3D bounding boxes into each of the 2-nd 2D GT bounding boxes, wherein, at the sub-process (b1), the computing device (i) generates each of 1-st 2D LiDAR bounding boxes by referring to each minimum value and each maximum value of each coordinate of each of the 1-st projected 3D LiDAR bounding boxes, (ii) calculates a 1-st IOU loss, which represents a loss related to each of matching ratios between each of the 1-st 2D LiDAR bounding boxes and each of the 1-st 2D GT bounding boxes, by applying IOU metric to each of the 1-st 2D LiDAR bounding boxes and each of the 1-st 2D GT bounding boxes, (iii) calculates a 1-st center loss which is a loss generated based on each difference between each center point of each of the 1-st 2D LiDAR bounding boxes and each center point of each of the 1-st 2D GT bounding boxes, (iv) generates a 1-st integrated loss based on the 1-st IOU loss and the 1-st center loss, (v) performs the regression process based on the 1-st integrated loss by fitting each of the 1-st 2D LiDAR bounding boxes, and (vi) updates parameters of a 3D LiDAR model through backpropagation based on the 1-st integrated loss, wherein the 3D LiDAR model is configured to generate each of one or more 3D LiDAR bounding boxes on a vehicle coordinate system after the LIDAR data in the raw data are inputted, wherein, at the step (a), the calibration data include one or more intrinsic parameters and one or more extrinsic parameters of a camera and each transformation parameter for converting each of the LiDAR data into each of the image data.

2. The method of claim 1, wherein, at the step (a), the computing device (i) inputs the LiDAR data in the raw data into a 3D LiDAR model, to thereby instruct the 3D LiDAR model to generate each of one or more 3D LiDAR bounding boxes on a vehicle coordinate system, (ii) acquires each of the projected 3D LiDAR bounding boxes by projecting each of the 3D LiDAR bounding boxes onto the image coordinate system based on each of the 3D LiDAR bounding boxes and the calibration data in the raw data, (iii) generates each of 2D LiDAR bounding boxes by referring to each minimum value and each maximum value of each coordinate of each of the projected 3D LiDAR Bounding boxes, and (iv) applies a Hungarian algorithm using IOU (Intersection over Union) metric to thereby detect whether each of the 2D LiDAR bounding boxes and each of the 2D GT bounding boxes are matched with each other.

3. The method of claim 1, wherein, at the sub-process (b2), in response to detecting that each of one or more 2-nd projected 3D LiDAR bounding boxes among the projected 3D LiDAR bounding boxes is not matched with any of the 2D GT bounding boxes, the computing device deletes each of the 2-nd projected 3D LiDAR bounding boxes.

4. The method of claim 1, wherein each of the 2D GT bounding boxes is obtained based on data generated by acquiring the image data from the camera, detecting each of the specific objects in the image data, and generating each of the 2D GT bounding boxes for each of the specific objects, through a deep learning model.

5. A method for labeling one or more specific objects by automatically creating one or more specific pseudo 3-Dimensional (3D) bounding boxes, comprising steps of:

(a) acquiring, by a computing device, each of one or more projected 3D LiDAR bounding boxes on an image coordinate system by using raw data including LiDAR data, image data and calibration data, and determining whether each of the projected 3D LiDAR bounding boxes is matched with each of one or more 2-Dimensional (2D) Ground Truth (GT) bounding boxes on the image coordinate system; and (b) executing, by the computing device, sub-processes of (b1) in response to detecting that each of one or more 1-st projected 3D LiDAR bounding boxes among the projected 3D LiDAR bounding boxes and each of one or more 1-st 2D GT bounding boxes among the 2D GT bounding boxes are matched with each other, performing, by the computing device, a regression process on each of the 1-st projected 3D LiDAR bounding boxes for fitting each of the 1-st projected 3D LiDAR bounding boxes into each of the 1-st 2D GT bounding boxes, and (b2) in response to detecting that each of one or more 2-nd 2D GT bounding boxes among the 2D GT bounding boxes is not matched with any one of the projected 3D LiDAR bounding boxes, generating, by the computing device, each of the specific pseudo 3D bounding boxes corresponding to each of the specific objects by referring to each of the 2-nd 2D GT bounding boxes and each piece of average size information and each piece of rotational information of each of the specific objects corresponding to each of the 2-nd 2D GT bounding boxes and then performing the regression process on each of the pseudo 3D bounding boxes for fitting each of the pseudo 3D bounding boxes into each of the 2-nd 2D GT bounding boxes, wherein, at the sub-process (b2), the computing device (i) acquires each of x-axis values and each of y-axis values related to each piece of positional information of each of the 2-nd 2D GT bounding boxes on the image coordinate system for each of the 2-nd 2D GT bounding boxes by referring to each of the 2-nd 2D GT bounding boxes, (ii) acquires each of z-axis values related to each piece of the positional information of each of the 2-nd 2D GT bounding boxes on the image coordination system by referring to each piece of depth information of each piece of the positional information of each of the 2-nd 2D GT bounding boxes on the LiDAR data in the raw data, (iii) determines each piece of predicted positional information of each of 3D bounding boxes corresponding to each of the specific objects by referring to each piece of the positional information of each of the 2-nd 2D GT bounding boxes, (iv) acquires each of average widths, average lengths and average heights corresponding to each of specific object classes pre-calculated by the 3D LiDAR model based on each of the specific object classes corresponding to each of the specific objects, wherein each of the specific object classes is confirmed through each of the 2-nd 2D GT bounding boxes and wherein the 3D LiDAR model is configured to generate each of one or more 3D LiDAR bounding boxes on a vehicle coordinate system after the LiDAR data in the raw data are inputted, (v) determines each piece of the average size information of each of the specific objects by referring to each of the average widths, the average lengths, and the average heights corresponding to each of the specific object classes, (vi) inputs the image data, among the raw data, to a yaw regression model to thereby instruct the yaw regression model to output each of 1-st rotational angles for each of the specific objects on a camera coordinate system, (vii) converts each of the 1-st rotational angles into each of 2-nd rotational angles for each of the specific objects on the vehicle coordinate system by referring to each of the 1-st rotational angles and the calibration data in the raw data, to thereby determine each piece of the rotational information for each of the specific objects, and (viii) generates each of the specific pseudo 3D bounding boxes by referring to each piece of the predicted positional information and each piece of the average size information and the rotational information for each of the specific objects, wherein, at the step (a), the calibration data include one or more intrinsic parameters and one or more extrinsic parameters of a camera and each transformation parameter for converting each of the LiDAR data into each of the image data.

6. The method of claim 5, wherein, at the sub-process (b2), the computing device inputs the image data into the yaw regression model, to thereby instruct the yaw regression model to (i) output each of multiple features, (ii) classify each heading direction of each of the specific objects into each specific multi-bin class among multiple multi-bin classes through each yaw class header after the yaw regression model applies concatenation operations and convolution operations to each of the multiple features, (iii) acquire each of 3-rd rotational angles, which is each rotation angle of each of the specific objects from each of specific reference angles, corresponding to each of the specific objects, among each of reference angles predetermined to correspond to each of the multiple multi-bin classes, (iv) acquire each of specific sign values corresponding to each of the heading directions of each of the specific objects through each of yaw delta headers by referring to each of multiple sign values predetermined based on each of the reference angles of each of the multiple multi-bin classes, (v) acquire each of 3-rd adjusted rotational angles by assigning each of the specific sign values to each of the 3-rd rotational angles, and (vi) predict each of the 1-st rotational angles for each of the specific objects based on each of the 3-rd adjusted rotational angles and the specific reference angles.

7. The method of claim 5, wherein, at the sub-process (b2), in response to detecting that each of the specific pseudo 3D bounding boxes is generated, the computing device (i) calculates each of matching ratios between each of the specific pseudo 3D bounding boxes and each of the 2-nd 2D GT bounding boxes by using IOU metric, and (ii) if some part of the matching ratios is below a predefined threshold, performs the regression process on some part of the specific pseudo 3D bounding boxes corresponding to the some part of the matching ratios.

8. The method of claim 7, wherein, at the sub-process (b2), the computing device (i) generates each of specific pseudo 2D bounding boxes by referring to each minimum value and each maximum value of each coordinate of each of the specific pseudo 3D bounding boxes, (ii) calculates a 2-nd IOU loss, which represents a loss related to each of matching ratios between each of the specific pseudo 2D bounding boxes and each of the 2-nd 2D GT bounding boxes, acquired by applying the IOU metric to each of the specific pseudo 2D bounding boxes and each of the 2-nd 2D GT bounding boxes, (iii) calculates a 2-nd center loss generated based on each difference between each center point of each of the specific pseudo 2D bounding boxes and each center point of each of the 2-nd 2D GT bounding boxes, (iv) generates a 2-nd integrated loss by referring to the 2-nd IOU loss and the 2-nd center loss, and (v) performs the regression process on each of the specific pseudo 2D bounding boxes by fitting each of the specific pseudo 2D bounding boxes based on the 2-nd integrated loss.

9. A computing device for labeling one or more specific objects by automatically creating one or more specific pseudo 3-Dimensional (3D) bounding boxes, comprising:

at least one memory which saves instructions; and at least one processor configured to execute the instructions to perform or support another device to perform processes of: (I) acquiring each of one or more projected 3D LiDAR bounding boxes on an image coordinate system by using raw data including LiDAR data, image data and calibration data, and determining whether each of the projected 3D LiDAR bounding boxes is matched with each of one or more 2-Dimensional (2D) Ground Truth (GT) bounding boxes on the image coordinate system; and (II) executing sub-processes of (II_1) in response to detecting that each of one or more 1-st projected 3D LiDAR bounding boxes among the projected 3D LiDAR bounding boxes and each of one or more 1-st 2D GT bounding boxes among the 2D GT bounding boxes are matched with each other, performing a regression process on each of the 1-st projected 3D LiDAR bounding boxes for fitting each of the 1-st projected 3D LiDAR bounding boxes into each of the 1-st 2D GT bounding boxes, and (II_2) in response to detecting that each of one or more 2-nd 2D GT bounding boxes among the 2D GT bounding boxes is not matched with any one of the projected 3D LiDAR bounding boxes, generating each of the specific pseudo 3D bounding boxes corresponding to each of the specific objects by referring to each of the 2-nd 2D GT bounding boxes and each piece of average size information and each piece of rotational information of each of the specific objects corresponding to each of the 2-nd 2D GT bounding boxes, and then performing the regression process on each of the pseudo 3D bounding boxes for fitting each of the pseudo 3D bounding boxes into each of the 2-nd 2D GT bounding boxes, wherein, at the sub-process (II_1), the processor (i) generates each of 1-st 2D LiDAR bounding boxes by referring to each minimum value and each maximum value of each coordinate of each of the 1-st projected 3D LiDAR bounding boxes, (ii) calculates a 1-st IOU loss, which represents a loss related to each of matching ratios between each of the 1-st 2D LiDAR bounding boxes and each of the 1-st 2D GT bounding boxes, by applying IOU metric to each of the 1-st 2D LiDAR bounding boxes and each of the 1-st 2D GT bounding boxes, (iii) calculates a 1-st center loss which is a loss generated based on each difference between each center point of each of the 1-st 2D LiDAR bounding boxes and each center point of each of the 1-st 2D GT bounding boxes, (iv) generates a 1-st integrated loss based on the 1-st IOU loss and the 1-st center loss, (v) performs the regression process based on the 1-st integrated loss by fitting each of the 1-st 2D LiDAR bounding boxes, and (vi) updates parameters of a 3D LiDAR model through backpropagation based on the 1-st integrated loss, wherein the 3D LiDAR model is configured to generate each of one or more 3D LiDAR bounding boxes on a vehicle coordinate system after the LiDAR data in the raw data are inputted, wherein, at the process (I), the calibration data include one or more intrinsic parameters and one or more extrinsic parameters of a camera and each transformation parameter for converting each of the LiDAR data into each of the image data.

10. The computing device of claim 9, wherein, at the process (I), the processor (i) inputs the LiDAR data in the raw data into a 3D LiDAR model, to thereby instruct the 3D LiDAR model to generate each of one or more 3D LiDAR bounding boxes on a vehicle coordinate system, (ii) acquires each of the projected 3D LiDAR bounding boxes by projecting each of the 3D LiDAR bounding boxes onto the image coordinate system based on each of the 3D LiDAR bounding boxes and the calibration data in the raw data, (iii) generates each of 2D LiDAR bounding boxes by referring to each minimum value and each maximum value of each coordinate of each of the projected 3D LiDAR Bounding boxes, and (iv) applies a Hungarian algorithm using IOU (Intersection over Union) metric to thereby detect whether each of the 2D LiDAR bounding boxes and each of the 2D GT bounding boxes are matched with each other.

11. The computing device of claim 9, wherein, at the sub-process (II_2), in response to detecting that each of one or more 2-nd projected 3D LiDAR bounding boxes among the projected 3D LiDAR bounding boxes is not matched with any of the 2D GT bounding boxes, the processor deletes each of the 2-nd projected 3D LiDAR bounding boxes.

12. The computing device of claim 9, wherein each of the 2D GT bounding boxes is obtained based on data generated by acquiring the image data from the camera, detecting each of the specific objects in the image data, and generating each of the 2D GT bounding boxes for each of the specific objects, through a deep learning model.

13. A computing device for labeling one or more specific objects by automatically creating one or more specific pseudo 3-Dimensional (3D) bounding boxes, comprising:

at least one memory which saves instructions; and at least one processor configured to execute the instructions to perform or support another device to perform processes of: (I) acquiring each of one or more projected 3D LiDAR bounding boxes on an image coordinate system by using raw data including LiDAR data, image data and calibration data, and determining whether each of the projected 3D LiDAR bounding boxes is matched with each of one or more 2-Dimensional (2D) Ground Truth (GT) bounding boxes on the image coordinate system; and (II) executing sub-processes of (II_1) in response to detecting that each of one or more 1-st projected 3D LiDAR bounding boxes among the projected 3D LiDAR bounding boxes and each of one or more 1-st 2D GT bounding boxes among the 2D GT bounding boxes are matched with each other, performing a regression process on each of the 1-st projected 3D LiDAR bounding boxes for fitting each of the 1-st projected 3D LiDAR bounding boxes into each of the 1-st 2D GT bounding boxes, and (II_2) in response to detecting that each of one or more 2-nd 2D GT bounding boxes among the 2D GT bounding boxes is not matched with any one of the projected 3D LiDAR bounding boxes, generating each of the specific pseudo 3D bounding boxes corresponding to each of the specific objects by referring to each of the 2-nd 2D GT bounding boxes and each piece of average size information and each piece of rotational information of each of the specific objects corresponding to each of the 2-nd 2D GT bounding boxes, and then performing the regression process on each of the pseudo 3D bounding boxes for fitting each of the pseudo 3D bounding boxes into each of the 2-nd 2D GT bounding boxes, wherein, at the sub-process (II_2), the processor (i) acquires each of x-axis values and each of y-axis values related to each piece of positional information of each of the 2-nd 2D GT bounding boxes on the image coordinate system for each of the 2-nd 2D GT bounding boxes by referring to each of the 2-nd 2D GT bounding boxes, (ii) acquires each of z-axis values related to each piece of the positional information of each of the 2-nd 2D GT bounding boxes on the image coordination system by referring to each piece of depth information of each piece of the positional information of each of the 2-nd 2D GT bounding boxes on the LiDAR data in the raw data, (iii) determines each piece of predicted positional information of each of 3D bounding boxes corresponding to each of the specific objects by referring to each piece of the positional information of each of the 2-nd 2D GT bounding boxes, (iv) acquires each of average widths, average lengths and average heights corresponding to each of specific object classes pre-calculated by the 3D LiDAR model based on each of the specific object classes corresponding to each of the specific objects, wherein each of the specific object classes is confirmed through each of the 2-nd 2D GT bounding boxes and wherein the 3D LiDAR model is configured to generate each of one or more 3D LiDAR bounding boxes on a vehicle coordinate system after the LiDAR data in the raw data are inputted, (v) determines each piece of the average size information of each of the specific objects by referring to each of the average widths, the average lengths, and the average heights corresponding to each of the specific object classes, (vi) inputs the image data, among the raw data, to a yaw regression model to thereby instruct the yaw regression model to output each of 1-st rotational angles for each of the specific objects on a camera coordinate system, (vii) converts each of the 1-st rotational angles into each of 2-nd rotational angles for each of the specific objects on the vehicle coordinate system by referring to each of the 1-st rotational angles and the calibration data in the raw data, to thereby determine each piece of the rotational information for each of the specific objects, and (viii) generates each of the specific pseudo 3D bounding boxes by referring to each piece of the predicted positional information and each piece of the average size information and the rotational information for each of the specific objects, wherein, at the process (I), the calibration data include one or more intrinsic parameters and one or more extrinsic parameters of a camera and each transformation parameter for converting each of the LiDAR data into each of the image data.

14. The computing device of claim 13, wherein, at the sub-process (II_2), the processor inputs the image data into the yaw regression model, to thereby instruct the yaw regression model to (i) output each of multiple features, (ii) classify each heading direction of each of the specific objects into each specific multi-bin class among multiple multi-bin classes through each yaw class header after the yaw regression model applies concatenation operations and convolution operations to each of the multiple features, (iii) acquire each of 3-rd rotational angles, which is each rotation angle of each of the specific objects from each of specific reference angles, corresponding to each of the specific objects, among each of reference angles predetermined to correspond to each of the multiple multi-bin classes, (iv) acquire each of specific sign values corresponding to each of the heading directions of each of the specific objects through each of yaw delta headers by referring to each of multiple sign values predetermined based on each of the reference angles of each of the multiple multi-bin classes, (v) acquire each of 3-rd adjusted rotational angles by assigning each of the specific sign values to each of the 3-rd rotational angles, and (vi) predict each of the 1-st rotational angles for each of the specific objects based on each of the 3-rd adjusted rotational angles and the specific reference angles.

15. The computing device of claim 13, wherein, at the sub-process (II_2), in response to detecting that each of the specific pseudo 3D bounding boxes is generated, the processor (i) calculates each of matching ratios between each of the specific pseudo 3D bounding boxes and each of the 2-nd 2D GT bounding boxes by using IOU metric, and (ii) if some part of the matching ratios is below a predefined threshold, performs the regression process on some part of the specific pseudo 3D bounding boxes corresponding to the some part of the matching ratios.

16. The computing device of claim 15, wherein, at the sub-process (II_2), the processor (i) generates each of specific pseudo 2D bounding boxes by referring to each minimum value and each maximum value of coordinates of each of the specific pseudo 3D bounding boxes, (ii) calculates a 2-nd IOU loss, which represents a loss related to each of matching ratios between each of the specific pseudo 2D bounding boxes and each of the 2-nd 2D GT bounding boxes, acquired by applying the IOU metric to each of the specific pseudo 2D bounding boxes and each of the 2-nd 2D GT bounding boxes, (iii) calculates a 2-nd center loss generated based on each of differences between each center point of each of the specific pseudo 2D bounding boxes and each center point of each of the 2-nd 2D GT bounding boxes, (iv) generates a 2-nd integrated loss by referring to the 2-nd IOU loss and the 2-nd center loss, and (v) performs the regression process on each of the specific pseudo 2D bounding boxes by fitting each of the specific pseudo 2D bounding boxes based on the 2-nd integrated loss.

* * * * *